(No Model.)
G. W. DIAMOND & S. TRUDEAU.
ADJUSTABLE ROPE REEL.
No. 442,309.     Patented Dec. 9, 1890.
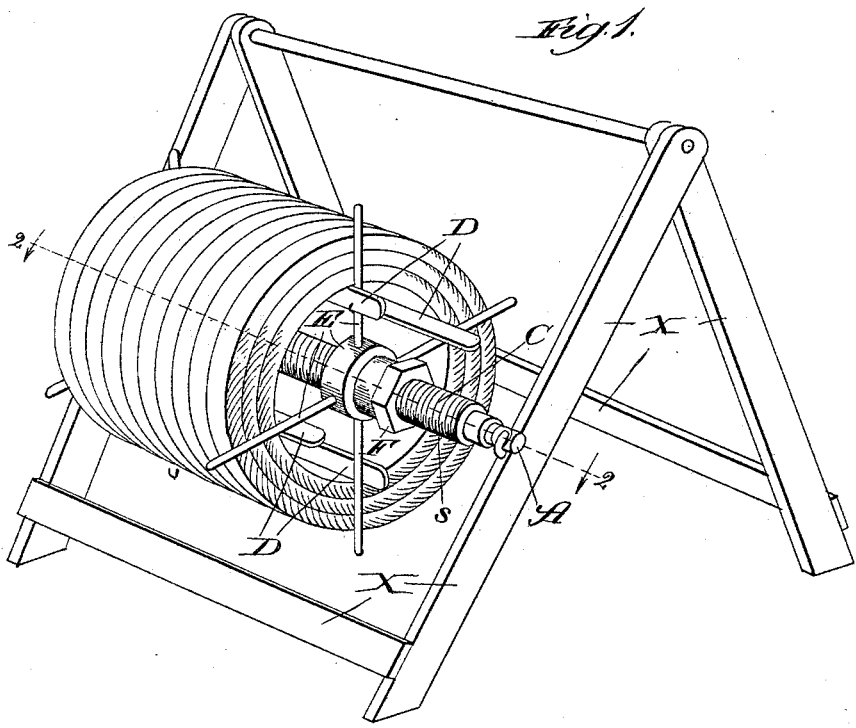
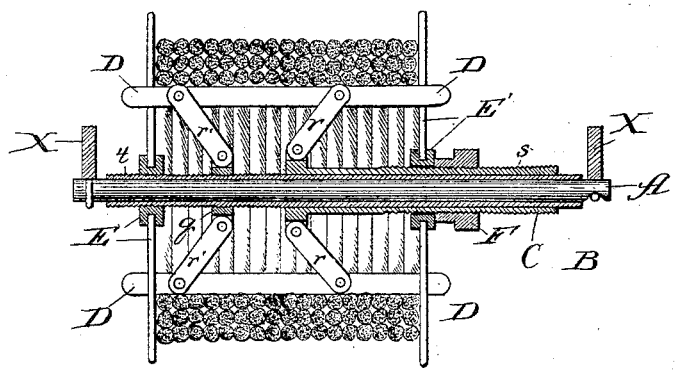

UNITED STATES PATENT OFFICE.

GEORGE W. DIAMOND AND SEFROIS TRUDEAU, OF MANTENO, ILLINOIS.

ADJUSTABLE ROPE-REEL.

SPECIFICATION forming part of Letters Patent No. 442,309, dated December 9, 1890.

Application filed April 8, 1890. Serial No. 347,114. (No model.)

*To all whom it may concern:*

Be it known that we, GEORGE W. DIAMOND and SEFROIS TRUDEAU, citizens of the United States, residing at Manteno, in the county of Kankakee and State of Illinois, have invented a new and useful Improvement in Adjustable Rope-Reels, of which the following is a specification.

Our invention relates to an improved rope-reel especially designed for the use of retail dealers who purchase rope by the coil and sell it in lengths severed therefrom; and our object is to provide a reel of this description, involving a construction adapting it to be readily adjusted to fit inside and sustain coils of rope of different internal diameters.

In the drawings, Figure 1 is a perspective view of our improved rope-reel supported upon a frame and having a coil of rope mounted upon it, and Fig. 2 a section taken on the line 2 2 of Fig. 1 and viewed in the direction of the arrows.

A is a shaft extending loosely through and beyond the opposite extremities of a sleeve B, which is provided along one end portion with an external screw-thread $t$. On the sleeve B and movable thereon is another and shorter sleeve C, provided externally along its end portion opposite the thread $t$ with a screw-thread $s$.

D D are bars located approximately equidistant apart around the sleeves, with which they extend parallel. The bars are pivotally connected toward one end to the inner end of the sleeve C by means of links $r$, and they are pivotally connected toward their opposite ends to a nut $q$ by means of links $r'$. The nut $q$ fits and is mounted to turn and travel upon the screw-threaded portion $t$ of the sleeve B. The links $r$ $r'$, pivotally connected at their outer ends to the bars D and at their inner ends, respectively, to the sleeve C and nut $q$, which support them, afford toggles so arranged as to cause the bars to be drawn toward the shaft or contracted as the supports C and $q$ approach each other, and expanded as the said supports recede from each other.

E is a retaining device for one side of the coil, comprising a hub provided with radial spokes and screw-threaded to fit the thread $t$.

E' is a retaining device for the opposite side of the coil, and comprises a hub also provided with radial spokes and fitting loosely over the sleeve C.

F is a nut upon the screw-threaded part $s$ of the sleeve C and arranged to bear against the hub of the retaining device E'. To place a coil of rope on the reel, the nut F is removed, which permits the part E' to be slid off the sleeve C. The nut $q$ and hub E may then be adjusted along the sleeve B to place them a proper distance apart, according to the inner diameter of the coil which is to be placed upon the reel. The device may then be stood upon end (the end adjacent to the retainer E) and the sleeve C allowed to drop down against the nut $q$ to draw in the bars D. The coil of rope is then placed around the bars to rest upon the spokes of the retainer E and the retainer E' placed in position upon the sleeve C to rest with its arms against the coil. The nut F is then screwed down against the hub of the retainer E' and the operation continued, when the bearing of the nut against the hub will cause it to draw up the sleeve C and expand the bars until they press firmly against the inner diameter of the coil. A suitable frame, as the frame X, may be provided for the reel, which is supported at the ends of its shaft in notches or hooks upon the frame and in a manner, preferably, to cause the shaft to be held against rotating with the reel when rope is unwound from the latter. If desired, to economize space, two or more reels may be placed one above the other on a single frame.

Our improved rope-reel thus affords a device of comparatively simple and economical construction and of great durability, which may be readily and speedily adjusted to support a coil of any diameter within the limits required, and which will operate when in use as a most desirable means in every way for the purpose which it subserves.

If desired, the sleeve B may be dispensed with, the thread $t$ formed upon the shaft A, and the sleeve C caused to fit more closely over the shaft. With the reel thus constructed the shaft should be mounted in the supporting-frame to rotate in its bearings. This and similar modifications of the construction shown would be within the spirit of our invention and are intended to be included herein.

What we claim as new, and desire to secure by Letters Patent, is—

1. In a reel, the combination of a supporting-shaft, supports upon the shaft relatively adjustable along the latter, bars D at intervals about the shaft, toggles $r\ r'$, connecting the bars D toward opposite ends, respectively, with the respective supports, means, substantially as described, for adjusting the supports with relation to each other to cause the bars D to approach or recede from the shaft, and retaining devices E E' toward opposite ends of the shaft, one of which is removable, substantially as set forth.

2. In a reel, the combination of a supporting-shaft, a support $q$, and a longitudinally-movable sleeve C upon the shaft, bars D at intervals about the shaft, toggles connecting the bars toward one end with the support $q$, and toggles connecting the bars toward their opposite ends with the sleeve C, means, substantially as described, for moving the sleeve toward or away from the support $q$ to cause the bars D to approach or recede from the shaft, and retaining devices E E' toward opposite ends of the shaft, one of which is removable, substantially as set forth.

3. In a reel, the combination of a supporting-shaft, a support $q$, adjustable along the shaft, a longitudinally-movable sleeve C upon the shaft, bars D at intervals about the shaft, toggles connecting the bars toward one end with the support $q$, and toggles connecting the bars toward their opposite ends with the sleeve C, means, substantially as described, for moving the sleeve toward or away from the support $q$ to cause the bars D to approach or recede from the shaft, and retaining devices E E' toward opposite ends of the shaft, one of which is removable, substantially as set forth.

GEORGE W. DIAMOND.
SEFROIS $\times$ TRUDEAU.
his mark

In presence of—
LEON EUGÈNE,
J. D. BREEN.